(12) United States Patent
Nemeth et al.

(10) Patent No.: US 12,447,419 B2
(45) Date of Patent: Oct. 21, 2025

(54) METHODS AND SYSTEMS FOR THERMAL FLUID CONDITIONING AND DELIVERY

(71) Applicant: The Boeing Company, Chicago, IL (US)

(72) Inventors: Kevin A. Nemeth, Chicago, IL (US); Gregory Kim, Chicago, IL (US); Jimmy P. Huynh, Chicago, IL (US)

(73) Assignee: The Boeing Company, Chicago, IL (US)

( * ) Notice: Subject to any disclaimer, the term of this patent is extended or adjusted under 35 U.S.C. 154(b) by 575 days.

(21) Appl. No.: 17/663,982

(22) Filed: May 18, 2022

(65) Prior Publication Data

US 2023/0372839 A1   Nov. 23, 2023

(51) Int. Cl.
*B01D 15/24*   (2006.01)
*B01D 15/12*   (2006.01)
(Continued)

(52) U.S. Cl.
CPC .......... *B01D 15/24* (2013.01); *B01D 15/125* (2013.01); *B01D 19/0036* (2013.01);
(Continued)

(58) Field of Classification Search
CPC ...... B01D 15/24; B01D 15/125; B01D 15/00; B01D 15/12; B01D 19/0036; B01D 19/00; B01D 36/001; B01D 36/003; B01D 36/00; B01D 17/0202; B01D 17/02; B01D 3/06; B01D 8/00; B64G 1/22; B64G 7/00;
(Continued)

(56) References Cited

U.S. PATENT DOCUMENTS 4,407,662 A * 10/1983 Ginder ............... C07C 29/76
                                                    95/123
5,161,385 A * 11/1992 Schumacher ........... F25B 45/00
                                                    62/85

(Continued)

FOREIGN PATENT DOCUMENTS

CN    113 702 481 A    11/2021
JP    S59 93172 A    5/1984

OTHER PUBLICATIONS

Extended European Search Report issued by the European Patent Office in application No. EP 23 17 2006.1 dated Sep. 22, 2023.

*Primary Examiner* — Akash K Varma
(74) *Attorney, Agent, or Firm* — Yee & Associates, P.C.

(57) ABSTRACT

Example implementations relate to techniques for thermal fluid conditioning and delivery. A technique may involve coupling a container of heat transfer fluid to an input and removing moisture from the heat transfer fluid via a molecular sieve. A pressure source is configured to push the heat transfer fluid out of the container and through the molecular sieve. Subsequent to removing the moisture from the heat transfer fluid, the technique involves separating, via an orifice coupled to a tank, the heat transfer fluid into liquid and gas particles within the tank and removing, via a vacuum coupled to the tank, the gas particles from the tank. The liquid can then be supplied into a fluid system via additional pressure by the pressure source. The technique may be performed by a portable device that houses the various components used to condition and delivery the thermal fluid.

20 Claims, 7 Drawing Sheets

(51) Int. Cl.
     *B01D 19/00*     (2006.01)
     *B01D 36/00*     (2006.01)
     *B64G 1/22*     (2006.01)

(52) U.S. Cl.
     CPC ......... *B01D 36/001* (2013.01); *B01D 36/003* (2013.01); *B64G 1/22* (2013.01)

(58) Field of Classification Search
     CPC .. C10G 53/08; B01J 4/00; F25B 23/00; F25B 2345/007; F25B 45/00; F28F 23/00
     USPC ........................................................ 210/651
     See application file for complete search history.

(56) References Cited

U.S. PATENT DOCUMENTS

2006/0130511 A1*   6/2006   Brown ................... F25B 45/00
                                                                             62/77
2023/0068184 A1*   3/2023   Liu ....................... G01N 1/4077

\* cited by examiner

500

OPEN A VALVE AT THE PRESSURE SOURCE SUCH THAT GAS PRESSURE ENTERS INTO THE CONTAINER AND PUSHES THE HEAT TRANSFER FLUID OUT OF THE CONTAINER AND THROUGH THE MOLECULAR SIEVE — 502

APPLY A FILTER TO REMOVE PARTICLES FROM THE HEAT TRANSFER FLUID SUBSEQUENT TO REMOVING THE MOISTURE FROM THE HEAT TRANSFER FLUID — 602

REMOVE, USING THE VACUUM, GAS FROM THE TANK TO ENABLE THE ORIFICE TO SEPARATE THE HEAT TRANSFER FLUID INTO THE LIQUID AND THE GAS PARTICLES WITHIN THE TANK — 702

FIGURE 7

METHODS AND SYSTEMS FOR THERMAL FLUID CONDITIONING AND DELIVERY

FIELD

The present disclosure relates generally to techniques for thermal fluid conditioning, and more particularly to a portable thermal fluid conditioning system that can condition and supply liquid to different types of fluid systems.

BACKGROUND

A heat transfer fluid is a gas or liquid that can enable heat transfer by serving as an intermediary in cooling on one side of a process, transporting and storing thermal energy, and heating on another side of a process. Heat transfer fluids are utilized within various applications, including industrial processes that involve heating or cooling.

The liquid phase of some heat transfer fluids can have useful heat transfer properties over a wide temperature range. For instance, some liquid phase heat transfer fluids can display useful heat transfer properties over a range of approximately negative 90 degrees Celsius to positive 200 degrees Celsius. As heat transfer fluid ages, the formation of low and high boiling compounds may result, which may require conditioning before use within a thermal fluid system. To condition the heat transfer fluid, low-boiling compounds can be vented from the system as necessary to a safe location away from users and sources of ignition while the high-boiling compounds are often very soluble in the fluid. Significant overheating or fluid contamination during heat transfer fluid conditioning can accelerate decomposition and may result in increased high-boiler and solids concentrations. In other applications, dissolved and entrained gases pose as issues in the dynamic operation of fluidic systems. To mitigate bubble generation as a result of these dynamic processes over a wide temperature range, heat transfer fluid can require fluid conditioning.

SUMMARY

In one example, a method for conditioning and supplying a liquid to a fluid system is described. The method involves coupling a container of heat transfer fluid to an input and removing moisture from the heat transfer fluid via a molecular sieve. A pressure source is configured to push the heat transfer fluid out of the container and through the molecular sieve. The method further involves, subsequent to removing the moisture from the heat transfer fluid, separating, via an orifice coupled to a tank, the heat transfer fluid into liquid and gas particles within the tank. The method also involves removing, via a vacuum coupled to the tank, the gas particles from the tank, removing, via a filter coupled to the tank, solid particles from the liquid, and supplying, via an output, the liquid into the fluid system, wherein the pressure source is configured to push the liquid out of the tank and into the fluid system.

In another example, a system for conditioning and supplying liquid to a fluid system is described. The system includes an input configured to couple to a container of heat transfer fluid, a molecular sieve configured to remove moisture from the heat transfer fluid, and a pressure source configured to push the heat transfer fluid out of the container and through the molecular sieve. The system also includes an orifice coupled to a tank. The orifice is configured to separate the heat transfer fluid into liquid and gas particles within the tank after removal of moisture from the heat transfer fluid. The system further includes a vacuum coupled to the tank. The vacuum is configured to remove the gas particles from the tank. The system also includes a filter coupled to the tank and configured to remove solid particles from the liquid. The system also includes an output configured to supply the liquid into the fluid system. The pressure source is configured to push the liquid out of the tank and into the fluid system.

In yet another example, a device for conditioning and supplying liquid to a fluid system is described. The device includes an input configured to couple to a container of heat transfer fluid, a molecular sieve configured to remove moisture from the heat transfer fluid, and a pressure source configured to push the heat transfer fluid out of the container and through the molecular sieve. The device also includes an orifice coupled to a tank. The orifice is configured to separate the heat transfer fluid into liquid and gas particles within the tank after removal of moisture from the heat transfer fluid. The device further includes a vacuum coupled to the tank, where the vacuum is configured to remove the gas particles from the tank, and an output configured to supply the liquid into the fluid system. The pressure source is configured to push the liquid out of the tank and into the fluid system. The device further includes a filter coupled to the tank and configured to remove solid particles from the liquid. The device also includes a housing structure having wheels. The input, the molecular sieve, the pressure source, the orifice, the tank, the vacuum, and the output are positioned on the housing structure.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 5 shows a flowchart of a method for use with the method shown in FIG. 4, according to an example implementation.

FIG. 6 shows a flowchart of a method for use with the method shown in FIG. 4, according to an example implementation.

FIG. 7 shows a flowchart of a method for use with the method shown in FIG. 4, according to an example implementation.

DETAILED DESCRIPTION

Figure 1:
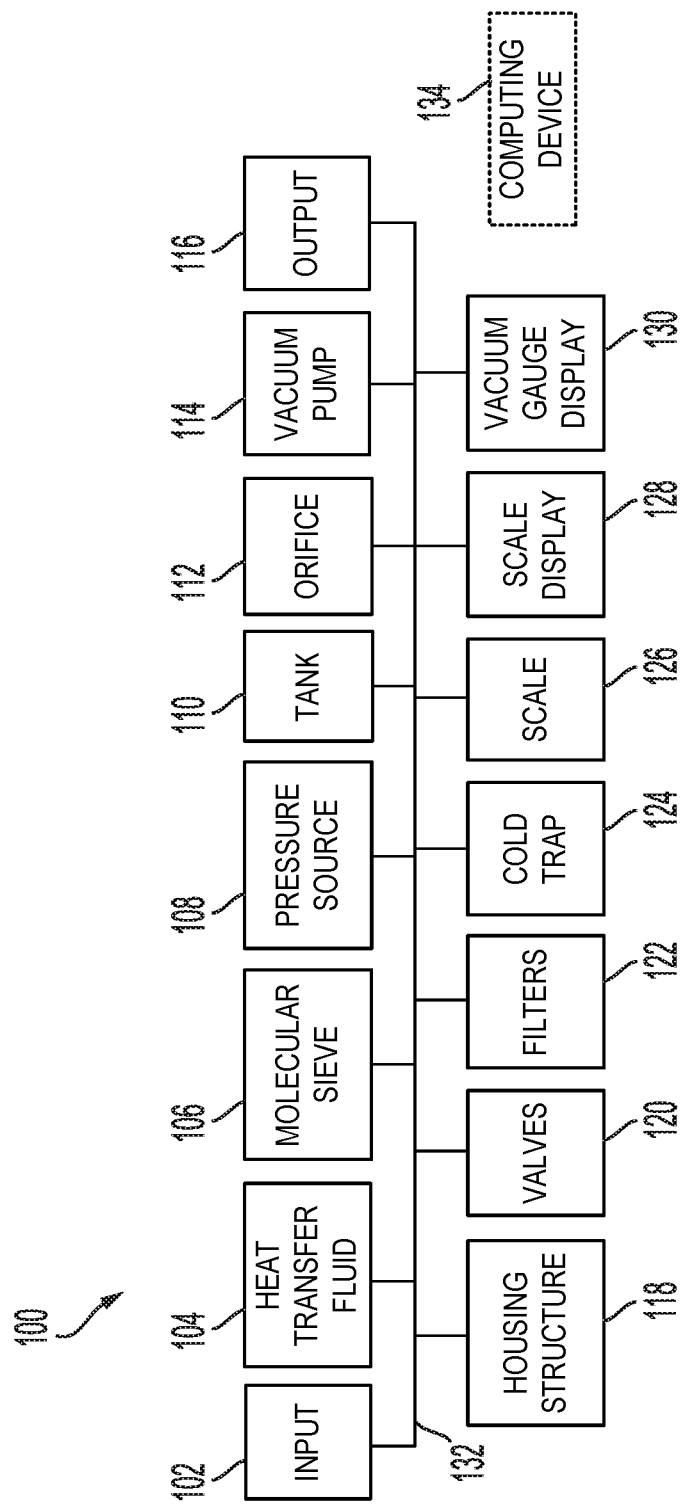
FIG. 1 illustrates a block diagram of a system for conditioning and delivering heat transfer fluid to a thermal management system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Heat transfer fluid can require conditioning to remove moisture, solid particles, and entrained and dissolved gases to prepare the fluid for use in various types of thermal management systems, such as within vehicles, spacecraft, and industrial applications, etc. Existing heat transfer fluid conditioning solutions typically involve multiple steps performed by physically separate equipment, which can create the potential for recontamination via contact with air during each individual process and during the transitions from process to process between the different equipment. In addition, supplementary equipment is then typically needed to transfer the conditioned heat transfer fluid into the thermal management system.

Examples presented herein relate to techniques for thermal fluid conditioning and delivery that avoid the drawbacks associated with existing heat transfer fluid conditioning processes. In particular, example systems, devices, and methods described herein enable conditioning and delivery of heat transfer fluid into a thermal management system without requiring multiple steps performed by physically separate equipment. Rather, disclosed techniques can be implemented by a singular device or system that can independently condition heat transfer fluid and deliver the fluid into a thermal management system without the need for additional equipment to facilitate the transfer into the thermal management system. The different devices and systems can involve components connected that enable efficient conditioning and delivery of liquid into a fluid system without requiring transfer of the fluid between physically separate components that require user connections.

By way of an example, a disclosed system can be configured to hook up to a standard container of heat transfer fluid (e.g., a 55 gallon transport drum of a hydrocarbon) and convey the fluid through a series of valves, hoses, and tubing prior to delivery into a destination thermal management subsystem. The system prepares the heat transfer fluid for the destination thermal management system via a vacuum pump system and dry gas delivery system. The system also conditions the heat transfer fluid by removing moisture (e.g., via a molecular sieve) and entrained and dissolved gases within the fluid via an orifice aeration process before supplying the conditioned heat transfer fluid to the thermal management system. As such, the system's configuration utilizes the vacuum system and dry gas delivery system to perform both the purification as well as the transfer into the thermal management system, which removes the need for additional physically separate equipment. In addition, the mechanical structure of the system can include wheels to enable the system to change positions near the receiving thermal management system (e.g., a machine or a vehicle, such as a spacecraft).

In some implementations, valves, the vacuum pump, and other components within the system can be controlled via a computing device. The computing device may receive user instructions and responsively perform disclosed conditioning techniques to prepare and supply the heat transfer fluid into the thermal management system. The computing device can also operate to automatically perform disclosed operations to condition heat transfer fluid for delivery into a thermal management system. In other implementations, valves, the vacuum pump, and other components can be manually controlled by a user. For instance, the user can open and close valves to control the movement of the heat transfer fluid through the system. As such, the system may include gauges, scales, and other features that enable the user to review states of components within the system. For instance, a scale may measure the weight of conditioned liquid ready for delivery into a thermal management system.

Disclosed systems and devices can also receive fluid from a thermal management system. For instance, the device can be positioned by a thermal management system, which may drain used heat transfer fluid into the device. The device can prepare the used fluid for disposal and/or may recondition the fluid in some instances.

Referring now to the Figures, FIG. 1 illustrates a block diagram of a system 100 for conditioning and supplying liquid to a fluid system. In the example, the system 100 includes an input 102, heat transfer fluid 104, a molecular sieve 106, a pressure source 108, a tank 110, an orifice 112, a vacuum pump 114, an output 116, housing structure 118, valves 120, filters 122, a cold trap 124, a scale 126, a scale display 128, and a vacuum gauge display 130. The elements of the system 100 are shown connected via connection 132. In other examples, the system 100 can have a different configuration, which may involve more or fewer components overall. For instance, the system 100 may also include a computing device 134 in some example implementations. In addition, the configuration and size of individual components within the system 100 can vary based on the use of the system 100.

The system 100 can represents a compact and portable system configured to condition and deliver heat transfer fluids directly to various types of thermal management systems. For instance, the system 100 can be used to condition and subsequently supply heat transfer fluids 104 to thermal management systems on spacecraft, vehicles, and within various industrial applications. The system 100 can be stationary in some examples, such as at a location that is accessible by thermal management systems (e.g., within a manufacturing setting). In other examples, the housing structure 118 of the system 100 can include wheels and/or another type of movement mechanism that allows the system 100 to change locations. This way, the system 100 can be repositioned by a spacecraft or another source selected to receive the conditioned liquid produced from the heat transfer fluid 104.

The input 102 can enable heat transfer fluid 104 to be initially connected to the system 100 for subsequent conditioning and delivery. In the example, the input 102 is configured to couple to a container containing the heat transfer fluid 104. For instance, the container of heat transfer fluid 104 can be a transport drum of hydrocarbon liquid (e.g., a synthetic hydrocarbon based liquid). As such, the input 102 can include one or more hoses and/or tubes (represented by connection 132), which can extend into the container and access the heat transfer fluid 104. As such, the type and quantity of heat transfer fluid 104 can vary within examples and may depend on the device or system using the conditioned heat transfer fluid 104 produced by the system 100. In some cases, the heat transfer fluid 104 can be generic heat transfer fluid (e.g., an off-the-shelf fluid).

The system 100 also includes a molecular sieve 106 that is configured to remove moisture from the heat transfer fluid 104. To enable the molecular sieve 106 to remove the moisture, the system 100 includes a pressure source 108 that can supply pressure to push the heat transfer fluid out 104 of its container and through the molecular sieve 106. In some example examples, the pressure source 108 is a tank containing an inert gas, such as helium, neon, argon, krypton, xenon, or radon. The pressure source 108 can differ in other examples. As such, the pressure source 108 can connect to the container of heat transfer fluid 104 via one or multiple tubes (represented by connection 132) that enable gas pressure to flow into the container to push out the heat transfer fluid 104 and through the molecular sieve 106. This way, the molecular sieve 106 can remove moisture of the heat transfer fluid 104 and prepare the heat transfer fluid 104 for further conditioning within the system 100. The pressure source 108 can provide different ranges of pressure within examples. For instance, the pressure source 108 can supply low pressure (e.g., less than 100 pounds per square inch (PSI), medium pressure (e.g., 500 to 2000 PSI), or high pressure (e.g., greater than 2000 PSI). Other pressure ranges can be used.

The configuration of the molecular sieve 106 can vary within examples. In practice, the molecular sieve 106 can be a material with pores, which may be uniform in size. The pores can have diameters that are similar in size to small molecules, which allows the moisture to be removed from the heat transfer fluid 104. In particular, contaminants and moisture cannot flow through the pores, which results in the molecular sieve 106 removing moisture while allowing a remainder of the heat transfer fluid 104 to flow through. In some examples, multiple molecular sieves can be used. In such cases, the molecular sieves can be redundant and/or different in configuration to further enhance moisture removal from the heat transfer fluid 104 by increasing the quantity of pores that the heat transfer fluid 104 experiences. In some cases, different materials are used within the molecular sieve 106 or multiple molecular sieves 106, which can remove moisture through the application of different sized pores.

After the molecular sieve 106 removes moisture from the heat transfer fluid 104, the system 100 can then cause the heat transfer fluid 104 to pass through an orifice 112, which is coupled to the tank 110. In practice, the orifice 112 is configured to separate the heat transfer fluid 104 into liquid and gas particles within the tank 110. The pressure source 108 can push the heat transfer fluid 104 through tubes connected to the orifice 112 to enable the orifice 112 to separate the heat transfer fluid 104 into liquid and gas particles. In some examples, the orifice 112 can include various types of agitation that further separate the heat transfer fluid 104 into liquid and gas particles. For instance, the orifice 112 can include an aerometer, metal mesh matrix, and/or sponges. In some examples, the diameter can be 0.01 to 0.02 inches for the orifice, which can vary in other cases. The diameter of the orifice 112 can influence the rate at which the heat transfer fluid 104 can be separated into liquid and gas within the tank 110.

The separation of the heat transfer fluid 104 into liquid and gas particles by the orifice 112 allows the vacuum pump 114 to remove the gas particles from the tank 110 and other components within the system 100. This removal of gas particles can take out contaminants from the heat transfer fluid 104 thereby producing a conditioned liquid that can be used within a fluid system. In practice, the vacuum pump 114 is connected to the tank 110 and can remove gases from the tank 110 to enable the orifice 112 to separate the heat transfer fluid 104 into gas and liquid. The vacuum pump 114 can regulate the pressure within the system 100 and enable the pressure source 108 to supply pressure that moves the heat transfer fluid 104 through the different components.

The configuration of the orifice 112 can differ within the examples. The vacuum pump 114 can be controlled by a user in some examples. For instance, the user can power on and power off the vacuum pump 114. In other examples, the vacuum pump 114 is controlled via computing device. The computing device may power on the vacuum pump 114 in response to other aspects within the system 100, such as the connection of the heat transfer fluid 104 to the input 102. In some implementations, the vacuum pump 114 can be operated at different settings, such as a high power setting and a low power setting. In addition, the type of the vacuum pump 114 can differ in some implementations. The vacuum pump 114 can be a dry scroll pump.

After the vacuum pump 114 removes the gas particles from the tank 110, the system 100 is configured to supply the liquid within the tank 110 into a thermal management system via the output 116 of the system 100. The output 116 may include one or more tubes that extend into the tank 110 and also connect to the receiving thermal management system, such as a spacecraft or another type of system or device that uses the conditioned liquid produced from the heat transfer fluid 104.

In addition, the system 100 includes a housing structure 118, which represents a mechanical structure for the system 100. In some examples, the housing structure 118 is configured with wheels to enable the system 100 to be moved around, such as to a location nearby the destination thermal management system. The different components of the system 100 are positioned on and connected to together relative to the housing structure 118 to allow mobility of the system 100.

As further shown in FIG. 1, the system 100 can also include other components, such as valves 120, filters 122, a cold trap 124, a scale 126, a scale display 128, and a vacuum gauge display 130. The valves 120 are devices that can regulate and control the flow of a fluid (e.g., gases, liquids, fluidized solids, or slurries), by opening, closing, or partially obstructing various passageways (represented by connection 132). The system 100 can incorporate valves 120 at various positions to regulate and control pressure from the pressure source 108 and/or to control the flow of the heat transfer fluid 104 through the system 100. In some examples, the valves 120 are manually adjusted via a user. For instance, the user may open, close, or partially open/close the valves 120 to enable the system 100 to condition and supply the heat transfer fluid 104. A computing device (e.g., computing device 134) may also control the valves 120 in some implementations. The valves 120 can also include pressure release valves that can allow gas pressure to be vented from the system 100. Similarly, the system 100 can also include one or more filters 122, which can be positioned at various locations relative to other components within the system 100. The filters 122 can separate solids from fluids (liquids or gases) by serving as a medium through which only the fluid can pass.

The cold trap 124 can be coupled to and provide protection for the vacuum pump 114. The cold trap 124 can condense the permanent gases into a liquid or solid and can prevent vapors from entering the vacuum pump 114 where they would condense and contaminate it. The cold trap can be a device that condenses vapors except the permanent gases into a liquid or solid.

The scale 126 can be connected to the tank 110 and enable the weight of the tank 110 to be measured and displayed on the scale display 128. This way, users can view how much liquid volume is positioned within the tank 110. Similarly, the settings of the vacuum pump 114 can be displayed on the vacuum gauge display 130. The scale 126 can be calibrated based on the weight of the tank 110 to enable a user to review and understand the volume of liquid located within the tank 110. In some examples, a computing device may adjust one or more valves 120 based on the weight of the liquid in the tank 110 provided by the scale 126. For instance, the computing device may provide a signal to adjust a valve 120 (or automatically adjust the valve 120) in response to the weight of the liquid and the tank 110 surpassing a predefined threshold. The predefined threshold may depend on the destination thermal management system.

In addition, the connection 132 shown in FIG. 1 is included to represent various types of interconnections between components within the system 100. As such, the connection 132 may include various types of tubes, hoses, wired and/or wireless connections, among others. In addition, gauges can be positioned at various points along the tubes/hoses to enable the pressure or other measurements to be displayed.

In other examples, the system 100 can use other components, different quantities of components, and other arrangements. For instance, the system 100 can also include a computing device 134, which can be communicate with one or more components of the system 100 via a wired or wireless connection. The computing device 134 can be used to adjust valves 120, the vacuum pump 114, and/or other components within the system 100. In other examples, a user may physically adjust the valves 120, the input 102, the vacuum pump 114 and/or other components within the system 100.

In addition to supplying a thermal management system with conditioned heat thermal fluid, the system 100 can also receive heat thermal fluid from the thermal management system. For instance, a spacecraft or another thermal management system application may drain used thermal fluid back into the system 100 via the output 116 or another receiving connection.

Figure 2:
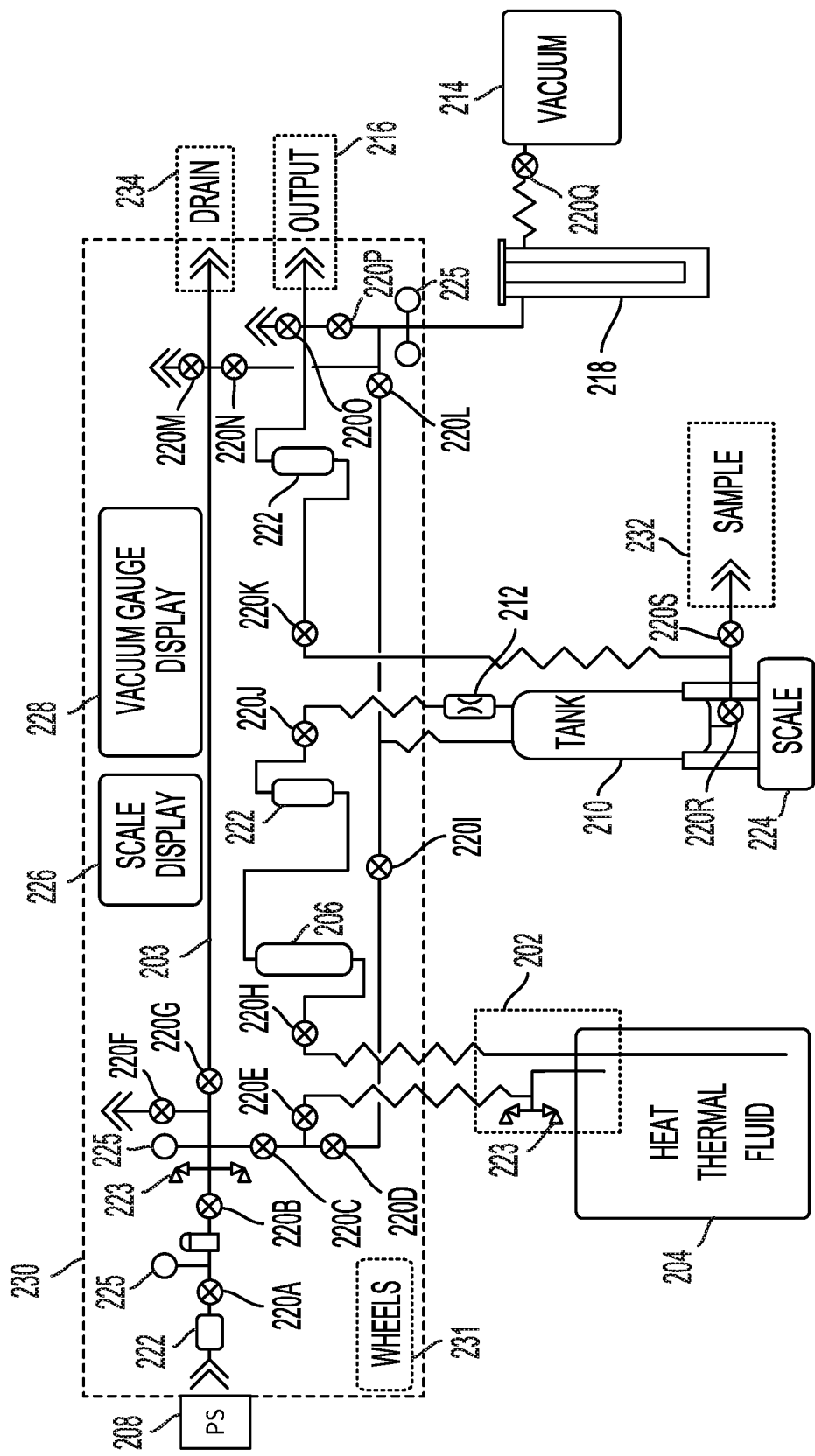
FIG. 2 illustrates a device configuration diagram for conditioning and delivering heat transfer fluid, according to an example implementation.

FIG. 2 illustrates a device configuration diagram for conditioning and delivering heat transfer fluid, according to an example implementation. In the example configuration diagram, the device 200 includes components arranged to condition and supply liquid to a fluid system. In other examples, the arrangement of components can differ for the device 200. In addition, the configuration can include more or fewer components in other potential arrangements.

As shown in the example implementation, the device 200 includes an input 202 configured to couple to a container 204 of heat transfer fluid. The input 202 and the container 204 as well as other components are connected together via tubes 203, which can include various types of connections between components. The size and configuration of the tubes 203 can differ within examples. In some instances, the container 204 can be a transport drum of hydrocarbon liquid or can have another configuration in some cases.

The device 200 also includes a molecular sieve 206, which is configured to remove moisture from the heat transfer fluid. In practice, a pressure source 208 is configured to push the heat transfer fluid out of the container 204 and through the molecular sieve 206. To enable pressure and the heat transfer fluid to flow through components of the device 200, the device 200 includes multiple valves (i.e., valve 220A, valve 220B, valve 220C, valve 220D, valve 220E, valve 220F, valve 220G, valve 220H, valve 220I, valve 220J, valve 220K, valve 220L, valve 220M, valve 220N, valve 220O, valve 220P, valve 220Q, valve 220R, and valve 220S). For instance, opening valves 220A-220C and valve 220E may enable gas pressure to flow from the pressure source 208 and into the container 204 holding heat thermal fluid. The gas pressure from the pressure source 208 can push the heat thermal fluid into the device 200 via the input 202 and through the molecular sieve 206 when the valve 220H positioned in between the input 202 and the molecular sieve 206 is open. For instance, the pressure source 208 can be a tank holding an inert gas that can flow through the device 200 pending on the current states of valves 220A-220S.

In the example implementation shown in FIG. 2, the device 200 further includes a filter 220 and a valve 220J is positioned between the molecular sieve 206 and the orifice 212. The filter 220 can further remove particles from the heat transfer fluid while the valve 220J can be used to limit the heat transfer fluid's access to the orifice 212. When the valve 220J is opened, the heat transfer fluid can flow through the molecular sieve 206 and the filter 222 before being separated into gas particles and liquid within the tank 210 by the orifice 212. To enable the separation of the heat transfer fluid within the tank 210, the tank 210 is connected to a vacuum 214. In the example, the vacuum 214 is able to remove gas particles from the tank and within the device 200 when a valve 220Q and a valve 220L are open. In addition, the vacuum 214 is coupled to a cold trap 218 that is configured to provide protection the vacuum 214 during operation. The cold trap 218 can be configured to prevent undesired materials from entering into the vacuum 214. For instance, the cold trap 218 can remove unwanted contaminants (e.g., water, solvents, acidic or alkaline compounds) from the gas stream or to prevent pump back streaming. These conditions can cause a loss of efficiency or damage when introduced into or emanating from the vacuum 214. In some examples, the cold trap 218 is a glass, tank, dry ice, vacuum cold trap vessel, or another configuration of cold trap.

As shown in FIG. 2, the orifice 212 is included within the device 200 to separate the heat transfer fluid into liquid and gas particles within the tank 210 after removal of moisture from the heat transfer fluid by the molecular sieve 206. The size of the tank 210 can vary and may depend on the desired liquid supply required by the thermal management system coupled at the output 216. As such, the vacuum 214 can remove air and/or other gas particles from the tank 210 to enable the orifice 212 to separate the heat transfer fluid into the liquid and the gas particles within the tank 210.

The device 200 is further configured with an output 216, which is configured to supply the liquid into a fluid system. In practice, the pressure source 208 is configured to push the liquid out of the tank 210 and into the fluid system. The output 216 is configured to supply the liquid into the fluid system after removal of the gas particles by the vacuum 214. In some examples, the fluid system may be positioned on a spacecraft and can be configured to reduce the potential of bubbles being created in the spacecraft's propulsion system by using the liquid to slowly supply the propulsion system.

The device 200 also includes pressure release valves 223 that can be used to release pressure produced by the pressure source 208 and pressure gauges 225 to indicate pressure within the device 200 relative to various components. The pressure gauges 225 allow a user to monitor the processes performed by the device 200, which also can signal if the user should open a pressure release valve 223 in some situations if pressure is too high.

The device 200 also includes a scale 224, which is positioned under the tank 210. The scale 224 can measure a weight of the tank 210 when the tank 210 includes liquid and subsequently display the weight of the tank 210 on a scale display 226 for the user or users to review. Similarly, the device 200 also includes a vacuum gauge display 228 configured to display a status of the vacuum 214.

As further shown, the device 200 includes a housing structure 230, which may further include wheels. The input 202, the molecular sieve 206, the pressure source 208, the orifice 212, the tank 210, the vacuum 214, the valves 220A-220S, the filters 222, and the output 216, among other components are positioned on and/or connected to the housing structure 230 to enable the device to change positions. The housing structure and wheels enable the device 200 to be moved to a position nearby the fluid system receiving the conditioned liquid produced by the device 200. The device 200 further includes a sample output 232. This enables liquid from the tank 210 to be obtained and sampled. The device also includes a drain connection 234 configured to connect to a drain to remove heat transfer fluid from the device 200.

Figure 3A:
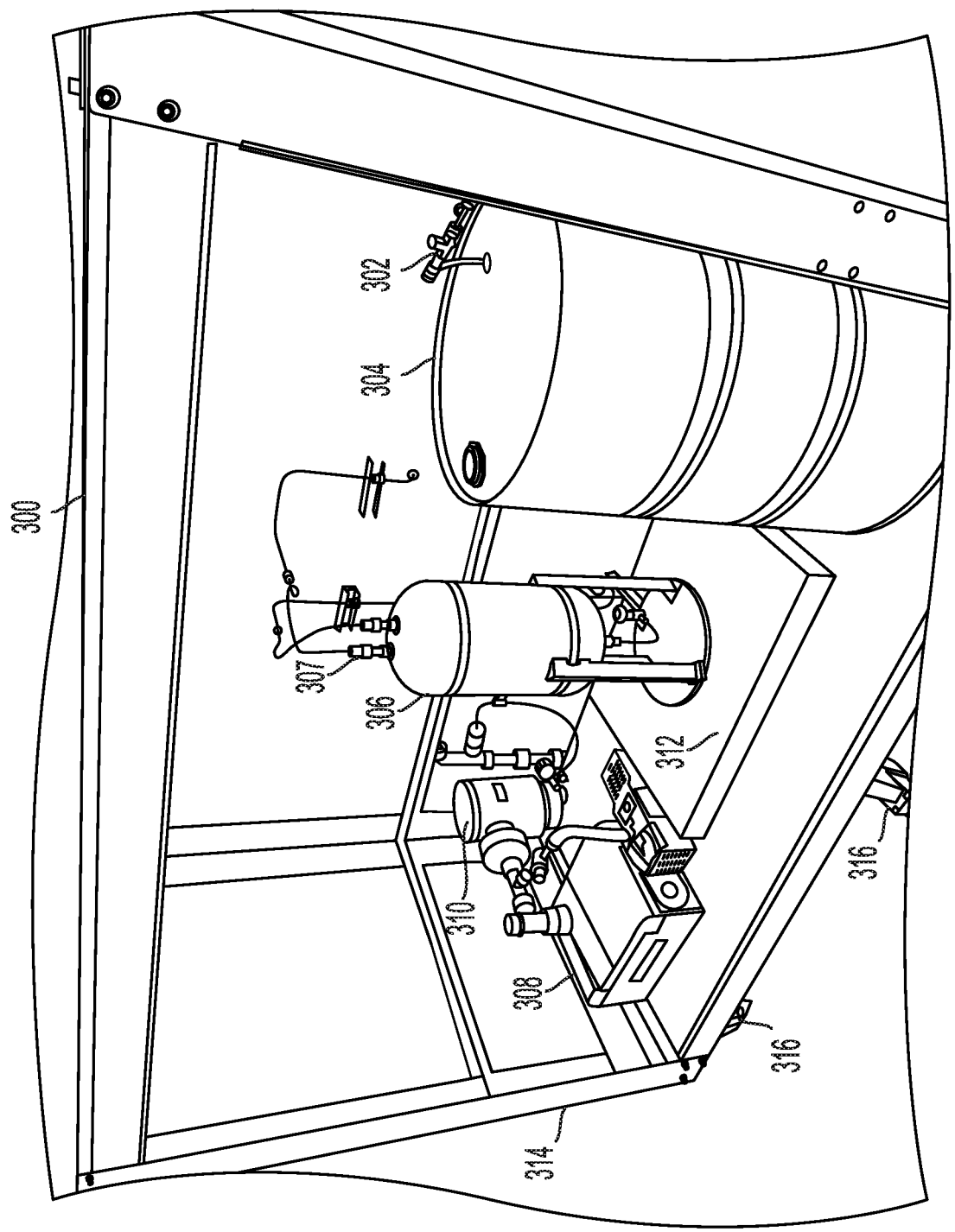
FIG. 3A depicts a device for conditioning and delivering heat transfer fluid, according to an example implementation.

FIG. 3A depicts a device 300 for conditioning and delivering heat transfer fluid, according to an example implementation. The device 300 may represent a physical build of the device configuration diagram depicted in FIG. 2 and/or the system 100 shown in FIG. 1. In other examples, the device 300 may be a variation of the example devices and systems described herein.

As shown in FIG. 3A, the device 300 includes an input 302 connected to a transport drum of hydrocarbon liquid 304. The device 300 also includes a tank 306 for receiving the hydrocarbon liquid after a molecular sieve removes moisture from the hydrocarbon liquid and an orifice 307 coupled to the tank 306 that can separate the hydrocarbon liquid into gas particles and liquid. The device 300 also includes the vacuum 308 coupled to the cold 310 and a scale 312 positioned under the tank 306. The device 300 includes housing 314 that is a cart that enables configuration of the different components of the device 300 for operations. As shown, the housing 314 includes wheels 316 to enable movement of the device 300.

Figure 3B:
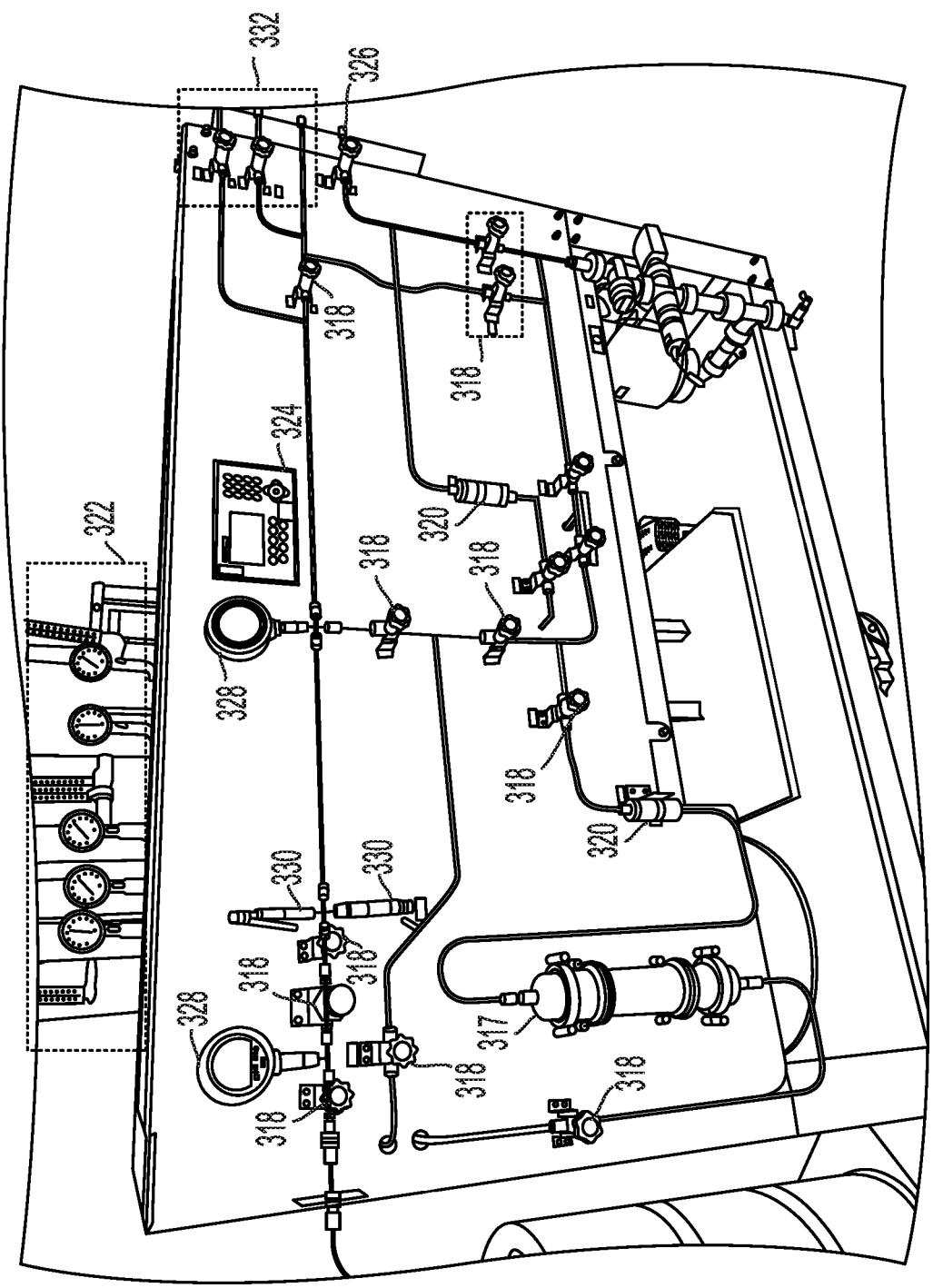
FIG. 3B depicts another view of the device for conditioning and delivering heat transfer fluid, according to an example implementation.

FIG. 3B depicts another view of the device 300 shown in FIG. 3A. As shown in this view depicted in FIG. 3B, the device 300 further includes a molecular sieve 317, valves 318, filters 320, gauges 322, displays 324, pressure gauges 328, pressure relief valves 330, and additional coupling points 332. The device 300 also includes an output 326 for supplying conditioned liquid to a thermal management system. The device 300 can also be configured to receive liquid from a thermal management system via the output 326 or another coupling component. The coupling points 332 may enable fluid to flow into a system from the device 300 and/or be used to receive fluid from the system. In addition, coupling points 332 can allow testing liquids prior to supplying the liquid into a system.

Figure 4:
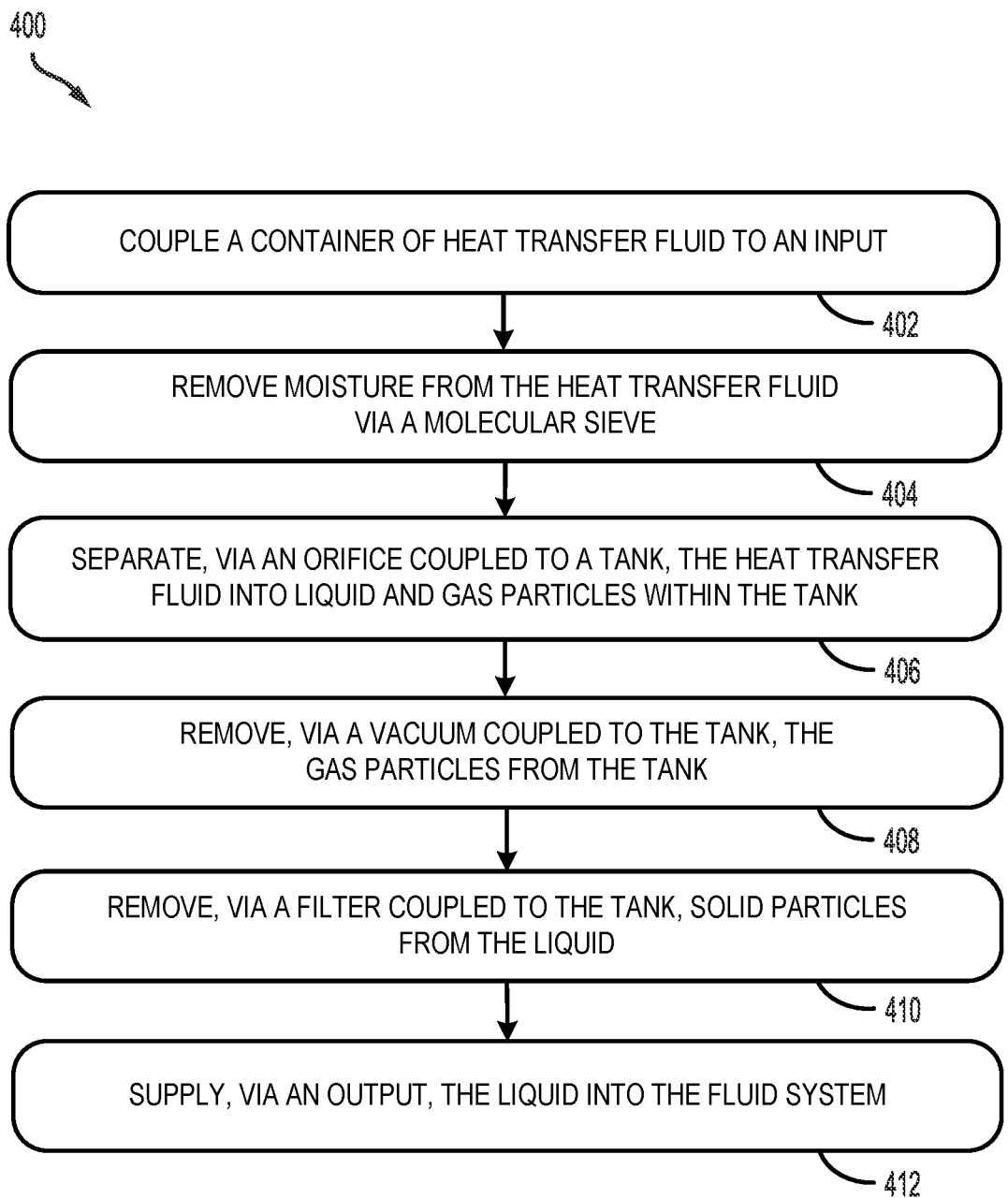
FIG. 4 is a method for conditioning and delivering heat transfer fluid, according to an example implementation.

FIG. 4 shows a flowchart of a method 400 for conditioning and supplying a liquid to a fluid system. The method 400 could be implemented by the system 100 shown in FIGS. 1 or device 200 shown in FIG. 2 and/or device 300 shown in FIGS. 3A-3B. In other examples, components of the devices and/or systems may be arranged to be adapted to, capable of, or suited for performing the functions, when operated in a specific manner.

The method 400 may include one or more operations, functions, or actions as illustrated by one or more of blocks 402, 404, 406, 408, 410, and 412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Block 402 of the method 400 involves coupling a container of heat transfer fluid to an input. For instance, the container can be coupled to the input 102 of the system 100 shown in FIG. 1, to the device 200 shown in FIG. 2 or the device 300 shown in FIGS. 3A-3B. In some examples, a transport drum of hydrocarbon liquid is coupled to the input of the receiving device or system.

Block 404 of the method 400 involves removing moisture from the heat transfer fluid via a molecular sieve. A pressure source is configured to push the heat transfer fluid out of the container and through the molecular sieve. For instance, the system 100 is shown in FIG. 1 with the molecular sieve 106 that can remove moisture from the heat transfer fluid 104 pushed out of the container by the pressure source 108.

Block 406 of the method 400 involves separating, via an orifice coupled to a tank, the heat transfer fluid into liquid and gas particles within the tank subsequent to removing the moisture from the heat transfer fluid. For the system 100 shown in FIG. 1, the pressure source 108 can further push the heat transfer fluid through the orifice 112, which is configured to separate the heat transfer fluid into liquid and gas within the tank 110.

Block 408 of the method 400 involves removing, via a vacuum coupled to the tank, the gas particles from the tank. The system 100 includes a vacuum pump 114 that can remove gas particles from the tank 110, which leaves the conditioned liquid inside the tank 110.

Block 410 of the method 400 involves removing, via a filter coupled to the tank, solid particles from the liquid. For instance, the system 100 can include filters 122 coupled to the downstream and upstream of the tank, which can be used to filter solid particles from the heat transfer fluid and the conditioned liquid prior to delivery into a fluid system. The type and quantity of filters can vary within examples.

Block 412 of the method 400 involves supplying, via an output, the liquid into the fluid system. The pressure source is configured to push the liquid out of the tank and into the fluid system. For the system 100, the pressure source 108 can push the liquid out of the tank 110 and into the fluid system via the output 116. In some instances, the liquid may be supplied to the fluid system once the tank accumulates a given volume of liquid in some examples. The given volume of liquid can depend on the fluid system. For instance, the fluid system can be part of a spacecraft that has specific liquid requirements.

FIG. 5 shows a flowchart of a method 500 for use with the method 400 shown in FIG. 4. At block 502, the method 500 involves opening a valve at the pressure source such that gas pressure enters into the container and pushes the heat transfer fluid out of the container and through the molecular sieve. For the system 100, one or more valves 120 can be opened to allow the pressure source to provide gas pressure that enters into the container and pushes the heat transfer fluid 104 out of the container and through the molecular sieve 106.

FIG. 6 shows a flowchart of a method 600 for use with the method 400 shown in FIG. 4. Block 602 of the method 600 involves applying a filter to remove particles from the heat transfer fluid subsequent to removing the moisture from the heat transfer fluid. The filter is coupled to the molecular sieve. For instance, the heat transfer fluid can be separated into the liquid and the gas particles within the tank subsequent to applying the filter to remove particles from the heat transfer fluid.

FIG. 7 shows a flowchart of a method 700 for use with the method 400 shown in FIG. 4. Block 702 of the method 700 involves removing, using the vacuum, gas from the tank to enable the orifice to separate the heat transfer fluid into the liquid and the gas particles within the tank. In some examples, the vacuum removes the gas particles from the tank while coupled to a cold trap. The cold trap is configured to protect the vacuum pump during removal of the gas particles.

Figure 8:
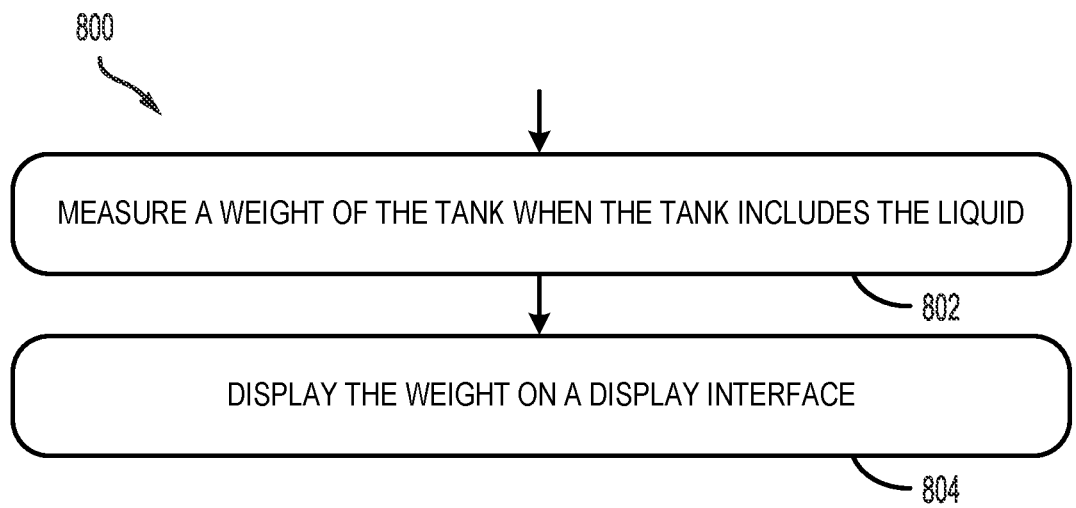
FIG. 8 shows a flowchart of a method for use with the method shown in FIG. 4, according to an example implementation.

FIG. 8 shows a flowchart of a method 800 for use with the method 400 shown in FIG. 4. Block 802 of the method 800 involves measuring a weight of the tank when the tank includes the liquid. The tank is positioned on a scale. Block 804 of the method 800 involves displaying the weight on a display interface.

Figure 9:
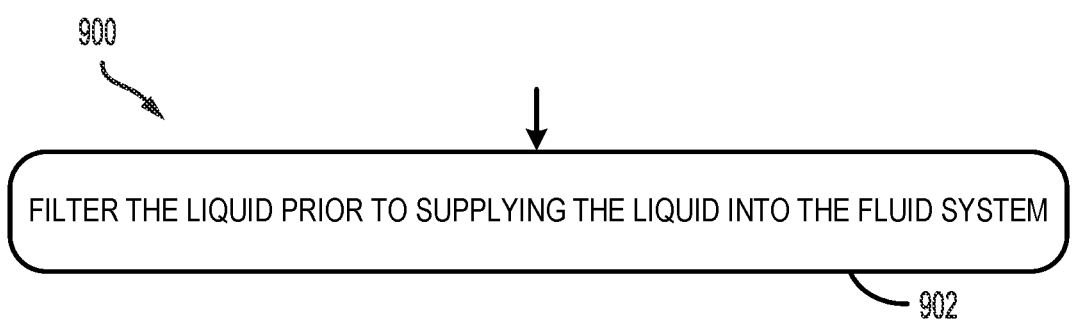
FIG. 9 shows a flowchart of a method for use with the method shown in FIG. 4, according to an example implementation.

FIG. 9 shows a flowchart of a method 900 for use with the method 400 shown in FIG. 4. Block 902 of the method 900 involves filtering the liquid prior to supplying the liquid into the fluid system.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

Further, the disclosure comprises examples according to the following clauses:

Clause 1. A method for conditioning and supplying a liquid to a fluid system comprising: coupling a container of heat transfer fluid to an input; removing moisture from the heat transfer fluid via a molecular sieve, wherein a pressure source is configured to push the heat transfer fluid out of the container and through the molecular sieve; subsequent to removing the moisture from the heat transfer fluid, separating, via an orifice coupled to a tank, the heat transfer fluid into liquid and gas particles within the tank; removing, via a vacuum coupled to the tank, the gas particles from the tank; removing, via a filter coupled to the tank, solid particles from the liquid; and supplying, via an output, the liquid into the fluid system, wherein the pressure source is configured to push the liquid out of the tank and into the fluid system.

Clause 2. The method of clause 1, wherein coupling the container of heat transfer fluid to the input comprises: coupling a transport drum of hydrocarbon liquid to the input.

Clause 3. The method of clause 1 or 2, further comprising: opening a valve at the pressure source such that gas pressure enters into the container and pushes the heat transfer fluid out of the container and through the molecular sieve.

Clause 4. The method of clause 3, wherein the pressure source is a tank comprising inert gas.

Clause 5. The method of any of clauses 1-4, further comprising: applying a filter to remove particles from the heat transfer fluid subsequent to removing the moisture from the heat transfer fluid, wherein the filter is coupled to the molecular sieve.

Clause 6. The method of claim 5, wherein separating the heat transfer fluid into liquid and gas particles within the tank comprises: separating the heat transfer fluid into the liquid and the gas particles within the tank subsequent to applying the filter to remove particles from the heat transfer fluid.

Clause 7. The method of any of clauses 1-6, further comprising: removing, using the vacuum, gas from the tank to enable the orifice to separate the heat transfer fluid into the liquid and the gas particles within the tank.

Clause 8. The method of any of clauses 1-7, wherein removing the gas particles from the tank comprises: removing the gas particles from the tank using the vacuum while the vacuum is coupled to a cold trap, wherein the cold trap is configured to protect the vacuum during removal of the gas particles.

Clause 9. The method of any of clauses 1-8, further comprising: measuring a weight of the tank when the tank includes the liquid, wherein the tank is positioned on a scale; and displaying the weight on a display interface.

Clause 10. The method of clauses 1-9, further comprising: filtering the liquid prior to supplying the liquid into the fluid system.

Clause 11. The method of any of clauses 1-10, wherein the fluid system is positioned on a spacecraft.

Clause 12. A system for conditioning and supplying liquid to a fluid system comprising: an input configured to couple to a container of heat transfer fluid; a molecular sieve configured to remove moisture from the heat transfer fluid; a pressure source configured to push the heat transfer fluid out of the container and through the molecular sieve; an orifice coupled to a tank, wherein the orifice is configured to separate the heat transfer fluid into liquid and gas particles within the tank after removal of moisture from the heat transfer fluid; a vacuum coupled to the tank, wherein the vacuum is configured to remove the gas particles from the tank; and an output configured to supply the liquid into the fluid system, wherein the pressure source is configured to push the liquid out of the tank and into the fluid system.

Clause 13. The system of clause 12, wherein the container of heat transfer fluid is a drum of hydrocarbon liquid.

Clause 14. The system of clause 12 or 13, further comprising: a valve coupled to the pressure source, wherein opening the valve releases gas pressure into the container such that the gas pressure pushes the heat transfer fluid out of the container and through the molecular sieve.

Clause 15. The system of any of clauses 12-14, wherein the pressure source is a tank comprising inert gas.

Clause 16. The system of any of clauses 12-15, further comprising: a filter coupled to the molecular sieve and configured to remove particles from the heat transfer fluid after the molecular sieve removes the moisture from the heat transfer fluid.

Clause 17. The system of clauses 12-16, wherein the vacuum is further configured to remove air from the tank to enable the orifice to separate the heat transfer fluid into the liquid and the gas particles within the tank.

Clause 18. The system of any of clauses 12-17, further comprising: a scale configured to measure a weight of the tank when the tank includes the liquid, wherein the tank is positioned on the scale; and a display interface configured to display the weight of the tank, and wherein the output is further configured to supply the liquid into the fluid system after removal of the gas particles by the vacuum, wherein the fluid system is positioned on a spacecraft.

Clause 19. The system of any of clauses 12-18, further comprising: a housing structure having wheels, wherein the input, the molecular sieve, the pressure source, the orifice, the tank, the vacuum, and the output are positioned on the housing structure.

Clause 20. A device for conditioning and supplying liquid to a fluid system comprising: an input configured to couple to a container of heat transfer fluid; a molecular sieve configured to remove moisture from the heat transfer fluid; a pressure source configured to push the heat transfer fluid out of the container and through the molecular sieve; an orifice coupled to a tank, wherein the orifice is configured to separate the heat transfer fluid into liquid and gas particles within the tank after removal of moisture from the heat transfer fluid; a vacuum coupled to the tank, wherein the vacuum is configured to remove the gas particles from the tank; a filter coupled to the tank, wherein the filter is configured to remove solid particles from the liquid; an output configured to supply the liquid into the fluid system, wherein the pressure source is configured to push the liquid out of the tank and into the fluid system; and a housing structure having wheels, wherein the input, the molecular sieve, the pressure source, the orifice, the tank, the vacuum, and the output are positioned on the housing structure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for conditioning and supplying a liquid to a fluid system comprising:
   coupling a container of heat transfer fluid to an input;
   removing moisture from the heat transfer fluid via a molecular sieve, wherein a pressure source is configured to push the heat transfer fluid out of the container and through the molecular sieve;
   subsequent to removing the moisture from the heat transfer fluid, separating, via an orifice coupled to a tank, the heat transfer fluid into liquid and gas particles within the tank;
   removing, via a vacuum coupled to the tank, the gas particles from the tank;
   removing, via a filter coupled to the tank, solid particles from the liquid; and
   supplying, via an output, the liquid into the fluid system, wherein the pressure source is configured to push the liquid out of the tank and into the fluid system.

2. The method of claim 1, wherein coupling the container of heat transfer fluid to the input comprises:
   coupling a transport drum of hydrocarbon liquid to the input.

3. The method of claim 1, further comprising:
   opening a valve at the pressure source such that gas pressure enters into the container and pushes the heat transfer fluid out of the container and through the molecular sieve.

4. The method of claim 3, wherein the pressure source is a tank comprising inert gas.

5. The method of claim 1, further comprising:
   applying the filter to remove the solid particles from the heat transfer fluid subsequent to removing the moisture from the heat transfer fluid, wherein the filter is coupled to the molecular sieve.

6. The method of claim 5, wherein separating the heat transfer fluid into liquid and gas particles within the tank comprises:
   separating the heat transfer fluid into the liquid and the gas particles within the tank subsequent to applying the filter to remove particles from the heat transfer fluid.

7. The method of claim 1, further comprising:
   removing, using the vacuum, gas from the tank to enable the orifice to separate the heat transfer fluid into the liquid and the gas particles within the tank.

8. The method of claim 1, wherein removing the gas particles from the tank comprises:
   removing the gas particles from the tank using the vacuum while the vacuum is coupled to a cold trap, wherein the cold trap is configured to protect the vacuum during removal of the gas particles.

9. The method of claim 1, further comprising:
   measuring a weight of the tank when the tank includes the liquid, wherein the tank is positioned on a scale; and displaying the weight on a display interface.

10. The method of claim 1, further comprising:
    filtering the liquid prior to supplying the liquid into the fluid system.

11. The method of claim 1, wherein the fluid system is positioned on a spacecraft.

12. A system for conditioning and supplying liquid to a fluid system comprising:
    an input configured to couple to a container of heat transfer fluid;
    a molecular sieve configured to remove moisture from the heat transfer fluid;
    a pressure source configured to push the heat transfer fluid out of the container and through the molecular sieve;
    an orifice coupled to a tank, wherein the orifice is configured to separate the heat transfer fluid into liquid and gas particles within the tank after removal of moisture from the heat transfer fluid;
    a vacuum coupled to the tank, wherein the vacuum is configured to remove the gas particles from the tank; and
    an output configured to supply the liquid into the fluid system, wherein the pressure source is configured to push the liquid out of the tank and into the fluid system.

13. The system of claim 12, wherein the container of heat transfer fluid is a drum of hydrocarbon liquid.

14. The system of claim 12, further comprising:
    a valve coupled to the pressure source, wherein opening the valve releases gas pressure into the container such that the gas pressure pushes the heat transfer fluid out of the container and through the molecular sieve.

15. The system of claim 12, wherein the pressure source is a tank comprising inert gas.

16. The system of claim 12, further comprising:
a filter coupled to the molecular sieve and configured to remove particles from the heat transfer fluid after the molecular sieve removes the moisture from the heat transfer fluid.

17. The system of claim 12, wherein the vacuum is further configured to remove air from the tank to enable the orifice to separate the heat transfer fluid into the liquid and the gas particles within the tank.

18. The system of claim 12, further comprising:
a scale configured to measure a weight of the tank when the tank includes the liquid, wherein the tank is positioned on the scale; and
a display interface configured to display the weight of the tank, and
wherein the output is further configured to supply the liquid into the fluid system after removal of the gas particles by the vacuum, wherein the fluid system is positioned on a spacecraft.

19. The system of claim 12, further comprising:
a housing structure having wheels, wherein the input, the molecular sieve, the pressure source, the orifice, the tank, the vacuum, and the output are positioned on the housing structure.

20. A device for conditioning and supplying liquid to a fluid system comprising:
an input configured to couple to a container of heat transfer fluid;
a molecular sieve configured to remove moisture from the heat transfer fluid;
a pressure source configured to push the heat transfer fluid out of the container and through the molecular sieve;
an orifice coupled to a tank, wherein the orifice is configured to separate the heat transfer fluid into liquid and gas particles within the tank after removal of moisture from the heat transfer fluid;
a vacuum coupled to the tank, wherein the vacuum is configured to remove the gas particles from the tank;
a filter coupled to the tank, wherein the filter is configured to remove solid particles from the liquid;
an output configured to supply the liquid into the fluid system, wherein the pressure source is configured to push the liquid out of the tank and into the fluid system; and
a housing structure having wheels, wherein the input, the molecular sieve, the pressure source, the orifice, the tank, the vacuum, and the output are positioned on the housing structure.

* * * * *